July 7, 1925.                    1,544,953
L. V. TAPPANA ET AL
HEAT CONSERVER
Filed June 12, 1924

Inventors
Leslie V. Tappana
Claude L. Tappana
By Jacobi + Jacobi
Attorneys

Patented July 7, 1925.

1,544,953

UNITED STATES PATENT OFFICE.

LESLIE V. TAPPANA AND CLAUDE L. TAPPANA, OF WEBB CITY, MISSOURI.

HEAT CONSERVER.

Application filed June 12, 1924. Serial No. 719,613.

*To all whom it may concern:*

Be it known that LESLIE V. TAPPANA and CLAUDE L. TAPPANA, citizens of the United States, residing at Webb City, in the county of Jasper and State of Missouri, have invented certain new and useful Improvements in Heat Conservers, of which the following is a specification.

This invention relates to a heat conserver and is particularly adapted for use in conjunction with gas or oil heaters and has for its principal object to provide a simple and efficient means for conserving the heat whereby the cooking utensil positioned thereon will be heated more readily and efficiently.

Another important object of the invention is to provide a heat conserver of the above mentioned character which is of such a construction as to enable the same to be easily and readily placed in position for use and will not in any way cause the alteration or addition of parts to the gas burner.

A still further object of the invention is to provide a heat conserver which is provided with detachable means for causing the heat from the burner to be easily distributed to the bottom of the utensil supported on the upper edge of the device.

An equally important object of the invention is to provide a heat conserver which is preferably formed of a composition which acts as a heat conducting element whereby the waste of the heat from the burner by radiation is prevented and furthermore, which is insulated so as to prevent any danger of burning.

A further object of the invention is to provide a device of the above mentioned character which is simple in construction, inexpensive, strong and durable and further well adapted for the purposes for which it is designated.

Another important object is to provide a heat conserver which will support various sizes of cooking utensils thereon when in use thereby saving considerable expense.

Other objects and advantages of this invention will become apparent during the course of the following description.

In the accompanying drawings, forming a part of this specification, and in which like numerals designate like parts throughout the same, Figure 1 is a vertical section of my improved heat conserver showing the same in position upon a burner.

Figure 1:
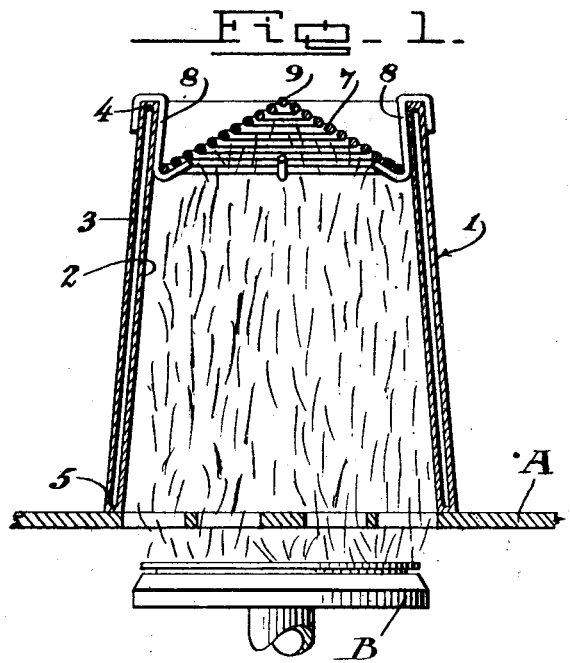
Figure 2:
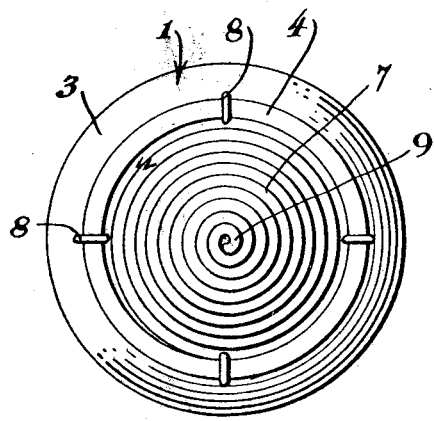
Figure 2 is a top plan view thereof.

In the drawings, wherein for the purpose of illustration is shown the preferred embodiment of our invention, the numeral 1 designates generally the tubular member which is formed of a heat conducting material, and comprises the spaced inner and outer walls 2 and 3 respectively. These walls are closed at their upper and lower ends as shown at 4 and 5 in the drawings, and as is noted from Fig. 1 of the drawings the tubular member tapers smaller towards its upper peripheral edge. This structure thereby forms a substantially cylindrical support which is adapted to rest on the top of the gas or oil burner designated by the letter A, so that the bottom 5 of the supporting member will extend around the opening in the top of the burner and directly around the heating element shown at B.

By providing a substantially cylindrical tubular support of the above mentioned character, wherein spaced walls are so arranged as to provide a dead air space therebetween, the proper insulation between the walls is provided, it being understood that the elements 4 and 5 will entirely close the upper and lower portions of the walls, thereby preventing the possibility of any air passing therethrough.

Adapted to be disposed within the upper portion of the tubular support 1, is the conical heat conserving element designated generally by the numeral 7. This conserving member is preferably formed of a single strand of wire and is of spiral formation, it, of course, being understood that the convolutions formed thereby will abut or overlie one another and may be furthermore secured together at spaced intervals in any suitable manner for the purpose of maintaining the conical shape. This conical shaped heat conserving element is furthermore adapted to be supported within the top of the tubular support by means of the hooks 8 which extend upwardly from the base of the conical member and along the inner faces of the upper portion of the inner wall 2 and have the free ends thereof bent upwardly to engage the upper edges of the tubular support. Any number of these supporting hooks may be provided in order to properly support the conical member within the tubular support and the purpose of these hooks is to enable the conical element to be detachably supported and centrally positioned within the support for the purpose to be hereinafter more fully described.

As clearly shown in Fig. 1 of the drawing, the apex of the conical heat conserving element 7 does not extend above the plane of the upper peripheral edge of the cylindrical support 1 so that a cooking utensil may be readily supported on said upper peripheral edge.

Figure 3:
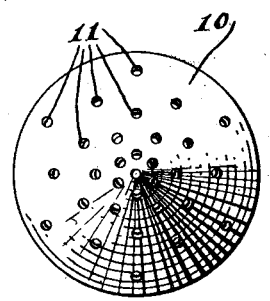
Figure 3 is a detail view of a modification of the conical shaped element.

In Fig. 3 of the drawing a modification of a conical heat conserving element is shown wherein the same is formed of one piece of metal and is provided with a series of spaced apertures 11 therein, these apertures being furthermore arranged in staggered relation so as to enable the heat to be evenly distributed thereto when the conical shaped plate 10 is used instead of the heat-conserving element which is formed of the single strand of wire.

With the parts arranged as shown in Fig. 1 of the drawing, the cooking utensil when in position on the upper edge of the tubular support will be caused to be heated uniformly by causing the heat from the burner to be conducted upwardly through the tubular support and passing through the heat conserving element in such a manner as to cause the bottom of the cooking utensil to receive the same degree of heat over its entire surface. Heretofore, when a cooking utensil was placed over the flame of the gas burner, without the use of a heat conserver, the central portion of the bottom of the cooking utensil was subjected to the greatest amount of heat and this did not provide for the even distribution of the heat of the burner to the cooking utensil and furthermore necessitated the constant stirring of the food within the utensil in order to prevent burning the same and to insure the proper heating thereof.

With a heat conserver of the above mentioned character the cooking utensil is held in a spaced position directly above the flame of the gas burner and in such a manner as to insure a uniform degree of heat against the bottom of the utensil and will furthermore prevent any possibility of burning the contents thereof. With a device of the above mentioned character the same may be easily and quickly set up in position for use and does not require the employment of any complicated number of tools or the addition of parts to the gas stove and the conical element may be detachably supported thereon so as to permit the same to be interchangeable and readily removable.

By providing a structure of the character heretofore described, the simplicity thereof will permit the same to be procured at a minimum cost and will produce very efficient results.

From the foregoing description of the construction of our improved apparatus, it will be seen that we have provided a simple, inexpensive and efficient means for carrying out the objects of the invention, and while we have particularly described the elements best adapted to perform the functions set forth, is is obvious that various changes in form, proportion, and in the minor details of construction may be resorted to, without departing from the spirit or sacrificing any of the principles of the invention.

What we claim is:—

1. A device of the above mentioned character comprising a substantially tubular support tapering smaller towards its upper end and including spaced walls closed at their upper and lower ends providing an air space therebetween, a conical heat conserving element, and hooks carried thereby for detachably supporting the same in the top of said support.

2. A device of the above mentioned character comprising a substantially tubular support tapering smaller at its upper edge, and a conical shaped heat conserving element detachably supported in the top thereof, said conical element being formed of a single strand of wire in spiral convolutions.

3. A device of the above mentioned character comprising a substantially tubular support tapering smaller at its upper edge, said support including spaced walls closed at their upper and lower ends and providing an air space therebetween, a conical shaped heat conserving element formed of a single strand of wire in spiral formation and having the convolutions thereof abutting one another, and means associated with said conical shaped conserving element for detachably supporting the same in the top of said support.

In testimony whereof we affix our signatures.

LESLIE V. TAPPANA.
CLAUDE L. TAPPANA.